United States Patent [19]

Suenaga

[11] Patent Number: 5,112,149
[45] Date of Patent: May 12, 1992

[54] VELOCITY RESPONSIVE HEAD DRIVING CONTROL APPARATUS OF MANUAL SWEEPING PRINTER

[75] Inventor: Takashi Suenaga, Tokyo, Japan

[73] Assignee: Casio Computer Co., Ltd., Tokyo, Japan

[21] Appl. No.: 622,230

[22] Filed: Dec. 3, 1990

Related U.S. Application Data

[63] Continuation of Ser. No. 381,140, Jul. 14, 1989, abandoned.

[30] Foreign Application Priority Data

Jul. 21, 1988 [JP] Japan ................ 63-180354

[51] Int. Cl.$^5$ .............................. B41J 3/36; B41J 2/37
[52] U.S. Cl. ...................................... 400/88; 400/120
[58] Field of Search ................. 400/88, 120, 120 HH, 400/193

[56] References Cited

U.S. PATENT DOCUMENTS

| | | | |
|---|---|---|---|
| 3,476,877 | 11/1969 | Perkins et al. | 400/120 |
| 3,767,020 | 10/1973 | Rowe | 400/88 |
| 4,492,482 | 1/1985 | Eguchi et al. | 400/120 |
| 4,750,049 | 6/1988 | Murakami et al. | 400/88 |
| 4,763,137 | 8/1988 | Damon | 400/120 |
| 4,915,027 | 4/1990 | Ishibashi | 400/120 |
| 4,933,867 | 6/1990 | Ishigaki | 400/88 |

FOREIGN PATENT DOCUMENTS

13361 1/1987 Japan ................ 400/124 TC

*Primary Examiner*—David A. Wiecking
*Assistant Examiner*—Steven S. Kelley
*Attorney, Agent, or Firm*—Frishauf, Holtz, Goodman & Woodward

[57] ABSTRACT

A manual sweeping printer has a linear thermal head and sweeps in a direction perpendicular to an arranging direction of the thermal head, thereby performing printing. The printer alternately drives two adjacent heating elements to perform 2-time-division printing. When a sweeping velocity of the printer exceeds a maximum sweeping velocity set in accordance with a printing speed, a divisional driving sequence is controlled to perform staggered printing.

15 Claims, 6 Drawing Sheets

VELOCITY RESPONSIVE HEAD DRIVING CONTROL APPARATUS OF MANUAL SWEEPING PRINTER

This application is a continuation of application Ser. No. 07/381,140, filed Jul. 14, 1989, now abandoned.

BACKGROUND OF THE INVENTION

1. Field of the Invention

The present invention relates to a head driving control apparatus of a manual sweep printer having a main body which can be moved over recording paper to obtain subsweeping, and perform a printing operation.

2. Description of the Related Art

Generally, a stationary printer or copying machine cannot perform printing on a bound notebook, recording paper not of regular sizes, or recording medium other than paper (e.g., hard plastic).

Therefore, in recent years, a manual sweep printer having a main body which can be moved over recording paper (medium) to perform printing data on the recording paper has been developed.

A printing, head of the above manual sweeping printer is driven, every time the apparatus main body sweeps across recording paper over a predetermined distance, thereby performing a printing operation.

In the above manual sweeping printer, however, a moving velocity of the apparatus main body becomes unstable to sometimes exceed a maximum allowable sweeping rate determined in accordance with a printing speed.

In this case, a printing failure occurs such that printed data are unnecessarily spaced apart from each other or are partially omitted.

SUMMARY OF THE INVENTION

The present invention has been made in consideration of the above situation and has as its object to provide a manual sweeping printer capable of performing printing with comparatively high quality even if a manual sweeping rate exceeds a maximum allowable sweeping rate determined in accordance with a printing speed.

In order to achieve the above object of the present invention, there is provided a printing apparatus comprising:

printing means (24, 66) having a plurality of printing elements arranged in a line, for printing data on a printing medium (A);

carriage means (14) for carrying said printing means (24) in a direction perpendicular to the line;

printing position detecting means (39) for detecting that said printing means (24) has been to a printing position on said printing medium (A);

data source means (63) for supplying data to said printing means every time said printing position detecting means (39) detects that said printing means has been carried to the printing position;

energizing means (65, AND2) for energizing one of every N printing elements (N is a positive integer not less than 1), in accordance with said data supplied from said data source means to said printing means; and control means (61) for controlling said energizing means (63, 65, 66), so as to start an energizing operation of said energizing means (63, 65, 66) when said data source means (62, 63) supplies said data to said printing means (62), and so as to energize remaing ones in a specific order by said energizing means.

With the above arrangement, the present invention can provide a manual sweeping printer which has advantages of, e.g., performing printing with comparatively high quality without degrading a printed shape, even if a manual sweeping rate exceeds a maximum sweeping rate determined in accordance with a printing speed, and therefore can be easily used by an operator. In addition, when the present invention is adopted in a normal automatic sweeping printer, a printer capable of performing both low-speed, high-quality printing and high-speed, low-quality printing can be provided.

DETAILED DESCRIPTION OF THE PREFERRED EMBODIMENTS

An embodiment of the present invention will be described in detail below with reference to the accompanying drawings.

Figure 1:
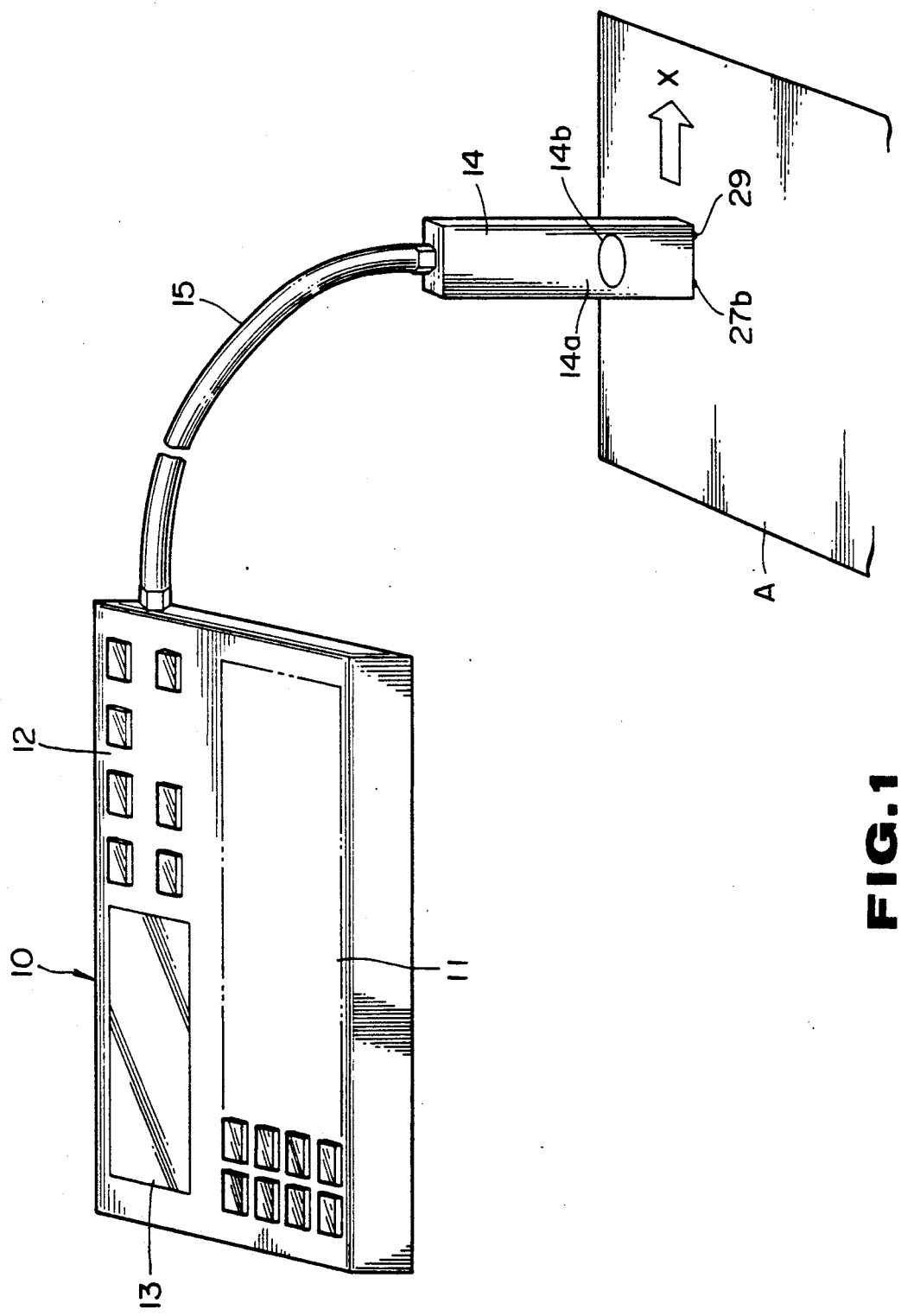
FIG. 1 is a perspective view showing an outer appearance of a word processor adopting an embodiment of the present invention.

FIG. 1 shows an outer appearance of a word processor comprising a manual sweeping printer according to the present invention.

A main body 10 of the above word processor comprises a key input unit 11, a function key unit 12, and a display unit 13.

The key input unit 11 is used to input characters, numerals, symbols and the like to form a document. The function key unit 12 includes keys for designating various functions required for document formation or printing, such as a mode switching key for switching between input and print modes, a cursor key, an insertion key, a delete key, and a shift key. The display unit 13 displays data supplied from the key input unit 11 or displays information corresponding to a function set by the function key unit 12.

A manual sweeping printer 14 is connected to the main body 10 via a connection cable 15.

Figure 2:
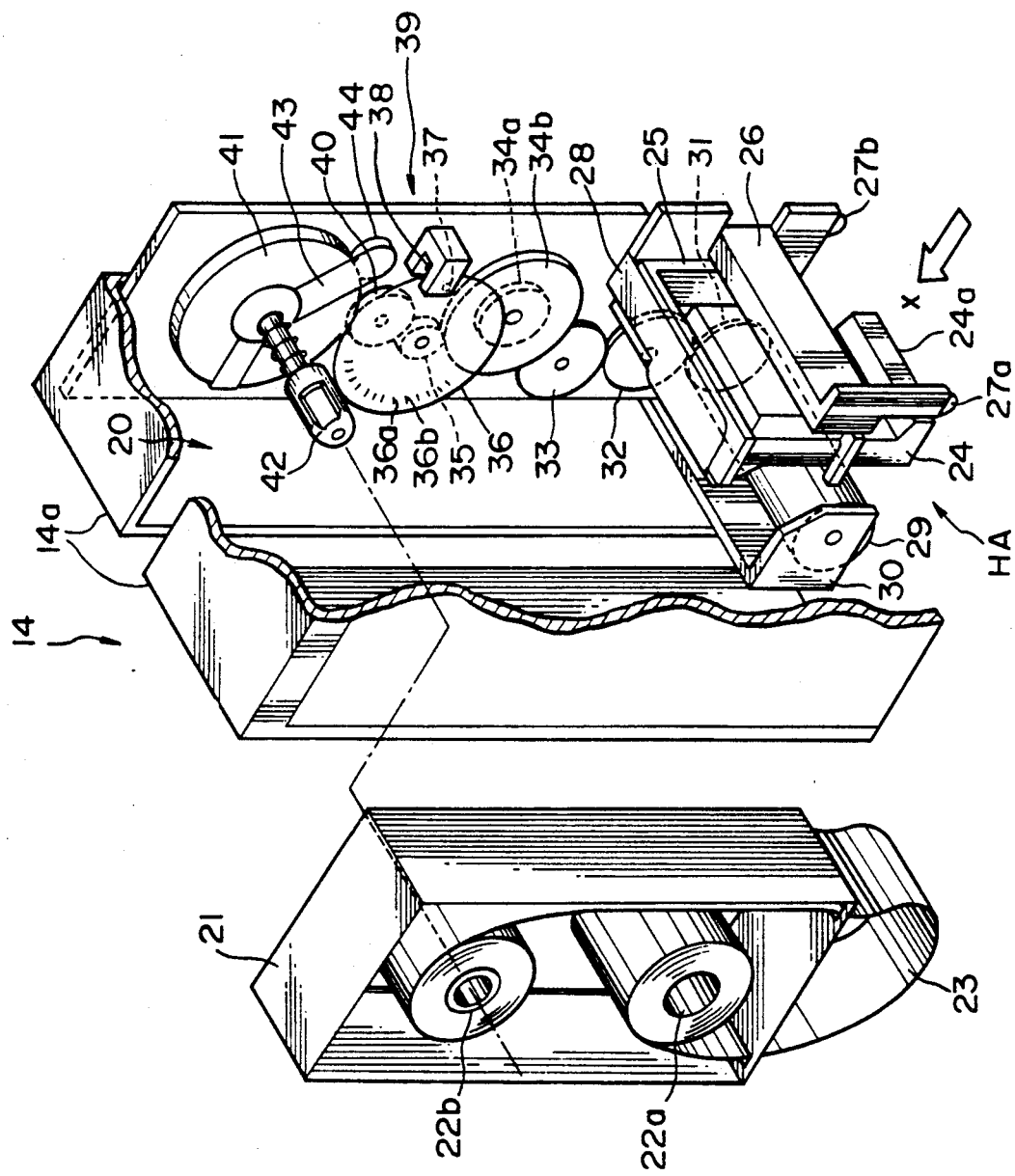
FIG. 2 is a perspective view showing a printing unit of the word processor shown in FIG. 1.

A print switch 14b is mounted on a side surface of a case 14a of the printer 14. An internal arrangement of the printer 14 is as shown in FIG. 2. The printer 14 is used by loading an ink ribbon cassette 21 in a printer mechanism unit 20 inside the case 14a. Referring to FIG. 2, the cassette 21 is made compact so as to be precisely inserted in and removed from the printer mechanism unit 20. The ink ribbon cassette 21 includes two ribbon spools 22a and 22b. The spools 22a and 22b serve as a feed spool and a take-up spool, respectively, for a thermal transfer ink ribbon 23. The cassette 21 is set in the printer mechanism unit 20 such that the ribbon 23 is partially pulled outside the cassette 21 at the lower end portion of the cassette 21. A thermal head 24 is located at a lower central portion of the printer mechanism unit 20 such that a head surface 24a slightly projects from the lower surface of the case 14a. The head 24 includes heat-generating members (in this embodiment 48 members for 48 dots) arranged in a line on the surface 24a. The head 24 is mounted on the printer mechanism unit 20 such that an arranging direction of the heat-generating members becomes perpendicular to a sweep (moving) direction X of the printer 14 for printing. The head 24 is supported to be vertically movable by a head mounting member 25. An elastic member (not shown) inserted between the member 25 and the head 24 normally applies a downward pressure on the head 24.

An ink ribbon guide 26 and abutting portions 27a and 27b are formed integrally with the head mounting member 25. The ink ribbon guide 26 is arranged near the rear side of the head 24 along the printing sweep direction X and guides movement of the ribbon 23. The abutting portions 27a and 27b are arranged to be spaced apart from each other at both ends of the guide 26, extend downward, and abut against recording paper A during printing operation.

A flexible printed circuit board 28 is arranged along the head mounting member 25. The circuit board 28 is connected to the head 24. A printing control signal is supplied to the head 24 via the circuit board 28. A rubber roller 29 is located at the front side of the head 24 along the sweep direction X. The roller 29 is mounted on an L-shaped frame 30 such that its peripheral portion partially project downward from the case 14a. When the manual printer 14 main body is swept in the direction indicated by the arrow X, the roller 29 rotates in contact with the paper A. A gear 31 is coaxially fixed to a side portion of the rubber roller 29. The gear 31 has a smaller diameter than that of the roller 29. The gear 31 is connected to an encoder disk 36 via gears 32, 33, 34a, 34b, and 35. For this reason, rotation of the roller 29 is transmitted to the disk 36. A plurality of slits 36a, 36b, . . . are radially formed with predetermined intervals therebetween in the disk 36. An LED 37 and a photosensor 38 are arranged adjacent to each other at positions opposing each other through a slit formation portion of the disk 36. The LED 37 and the photosensor 38 are arranged such that light emitted from the LED 37 is incident on the photosensor 38 through one of the slits 36a, 36b, . . . formed in the disk 36. The incident light on the photosensor 38 is interrupted in accordance with a sweep distance of the printer 14 because the disk 36 rotates upon sweeping of the printer 14 in the X direction. That is, the disk 36, the LED 37, and the photosensor 38 constitute an encoder 39.

A take-up gear 41 is connected via a gear 40 to the gear 35 fixed to the same rotating shaft as that of the disk 36. Therefore, rotation of the roller 29 is transmitted to the disk 36 and then to the take-up gear 41. A ribbon take-up shaft 42 coaxially extends from the take-up gear 41. A stopper arm 43 which urges against the take-up gear 41 is mounted on a proximal end portion of the shaft 42. The arm 43 pivots in a rotating direction of the gear 41 by an urging force against the gear 41. A stopper gear 44 which meshes with the gear 41 is provided at the distal end of the arm 43. When the take-up gear 41 rotates in a forward direction (ribbon take-up direction), the stopper arm 43 pivots through a predetermined angle in the same direction and abuts against and stops at a locking portion (not shown). When the gear 41 rotates in a reverse direction, the arm 43 pivots until the stopper gear 44 at its distal end meshes with the gear 40 and then stops. That is, when the gear 41 rotates in the reverse direction, the gear 44 meshes with both the gears 40 and 41. Therefore, rotation of the gears 40 and 41 is interrupted, and the arm 43 and the gear 44 serve as a reverse rotation interrupting mechanism.

Figure 3:
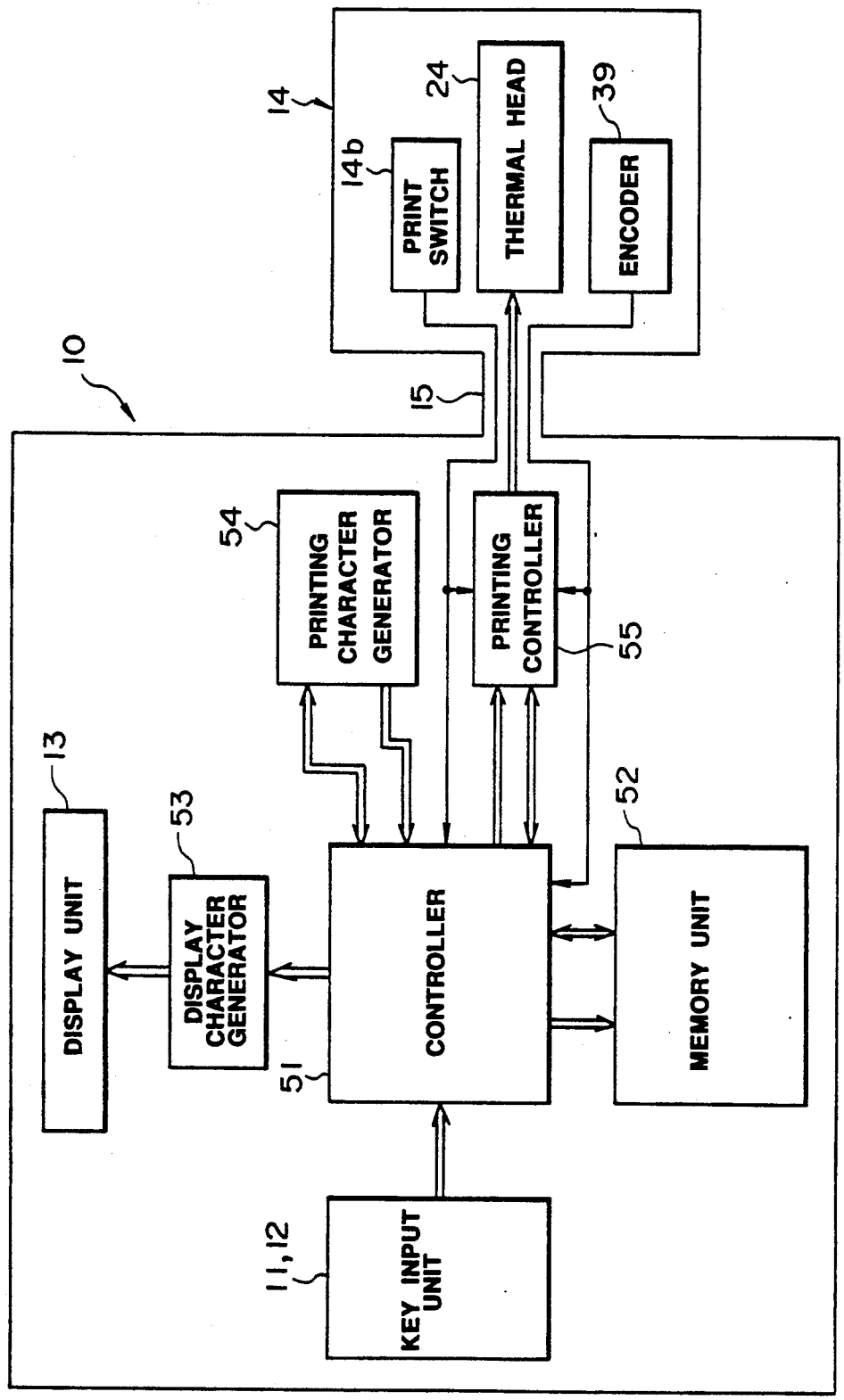
FIG. 3 is a block diagram showing an electronic circuit of the word processor shown in FIG. 1.

FIG. 3 shows an arrangement of an electronic circuit formed in the word processor main body 10 and the manual printer 14. Referring to FIG. 3, reference numeral 51 denotes a controller. The controller 51 receives various key input operation signals from the key input unit 11 and the function key unit 12, a print signal from the print switch 14b of the manual printer 14, and an encoder pulse signal from the encoder 39. In accordance with the various key operation signals and switch operation signals from the units 11 and 12 and the switch 14b, the controller 51 controls a memory unit 52, a display character generator 53, a printing character generator 54, and a printing controller 55. The memory unit 52 stores document information formed by a key-input operation.

Character data and symbol data of the individual characters and symbols stored in the unit 52 are supplied to and displayed on the display unit 13 via the display character generator 53.

The character and symbol data are also supplied to the printing character generator 54. The generator 54 outputs corresponding data such as printing character pattern data to the printing controller 55. While the manual printer 14 outputs a print signal upon ON operation of the print switch 14b, the controller 55 receives an encoder pulse from the encoder 39. In synchronism with the encoder pulse, the controller 55 transfers the printing character pattern data supplied from the generator 54 to the thermal head 24 in units of lines. In this embodiment, the one-line printing character pattern data (48 dots) is divisionally printed, e.g., twice for one encoder pulse. In this manner, an instantaneous driving power consumption of the head 24 is reduced.

Figure 4:
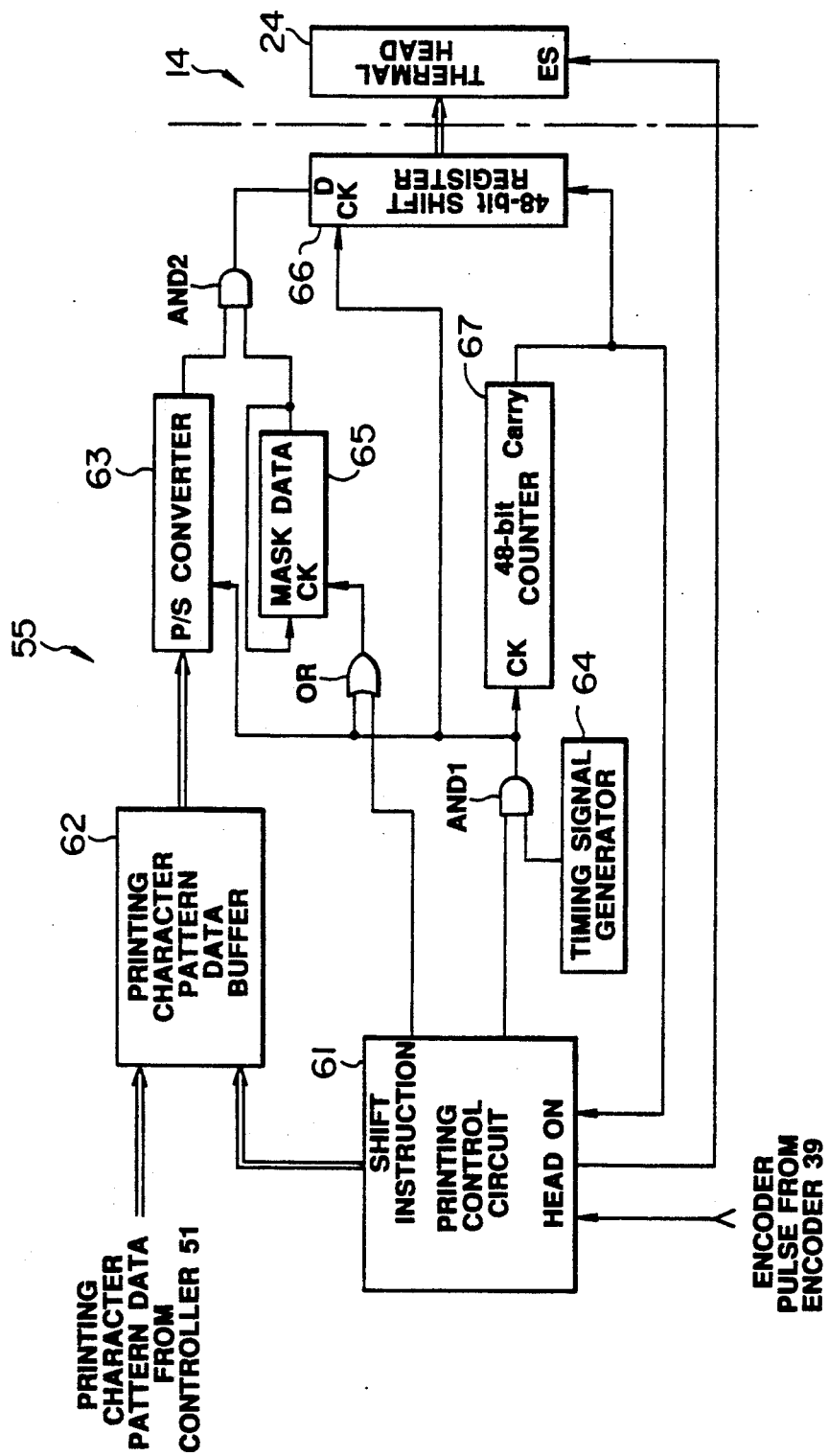
FIG. 4 is a block diagram showing in detail a printing controller of the word processor shown in FIG. 3.

FIG. 4 shows an internal circuit arrangement of the printing controller 55. A control operation of the controller 55 is mainly performed by a printing control circuit 61. The circuit 61 supplies a read/write control signal to a printing character pattern data buffer 62 for storing printing character pattern data supplied via the controller 51. The buffer 62 stores one-line (48-bit) printing character pattern data in accordance with the read/write control signal from the circuit 61. The one-line printing character pattern data stored in the buffer 62 is output to a parallel/serial (P/S) converter 63. In synchronism with a timing signal supplied from a timing signal generator 64 via an AND gate AND1, the P/S converter 63 converts the printing character pattern data parallel-input from the buffer 62 into serial data and outputs the serial data. The printing character pattern data converted into the serial data is output to an AND gate AND2 in sequence and ANDed with mask data from a mask data register 65. The register 65 stores successive data "1, 0, 1, 0, . . . " basically different every other bit. In synchronism with a clock pulse supplied to a clock terminal CK via an OR gate, the register 65 outputs mask data "1→0→1→0→ . . . ". The printing data output from the P/S converter 63 is ANDed with the mask data in units of bits by the AND gate AND2 and supplied to a 48-bit shift register 66. That is, the one-line printing character pattern data (48 bits) is masked every other bit and stored in the register 66. The timing signals from the timing signal generator 64 are counted by a 48-bit counter 67. A carry signal from the counter 67 is output to the 48-bit shift register 66 as a shift input stop instruction and to the printing control circuit 61. When the circuit 61 receives the carry signal supplied from the counter 67, the AND gate AND1 is disabled.

Selected printing data stored in the register 66 is transferred to the thermal head 24 in response to the carry signal, and transferred and printed on recording paper A in response to a head-ON signal from the circuit 61. In a normal printing sweeping state, a printing operation is performed twice for each encoder pulse. When first selective printing data is printed, the mask data in the register 65 is shifted by one bit and set. The one-line printing character pattern data output via the P/S converter 63 is masked ever other bit and supplied to the register 66. Therefore, since the one-line printing character pattern data is masked by the mask data which is shifted by one bit, data different from data masked upon first selective printing is masked.

More specifically, of the 48-bit, one-line printing character pattern data, 1st-, 3rd-, 5th-, . . . , 45th-, and 47th-bit data are selectively printed in the first printing operation, and 2nd-, 4th-, 6th-, . . . , 46th-, and 48th-bit data are selectively printed in the second printing operation. That is, the thermal head 24 is driven twice every other dot.

An operation of the word processor having the above arrangement will be described below.

In order to form a desired document, the mode switching key of the function key unit 12 is operated to designate an input mode. As a result, the controller 51 is set in the input mode. A user then operates the key input unit 11 and the function key unit 12 to input desired characters, symbols, and the like in sequence.

When the operator operates the character and symbol input keys and the function key unit 12 to key-input document information to be formed, the input data is displayed on the display unit 13 via the controller 51 and the display character generator 53 and transferred to and stored in the memory unit 52 in sequence.

In order to print the document data stored in the memory unit 52, the operator operates the mode switching key of the function key unit 12 to designate a print mode. As a result, the controller 51 is set in the print mode. In the print mode, the memory unit 52 is set in a state of reading out the stored document data, and the printing controller 55 is set in a state of waiting for input of an encoder pulse from the encoder 39 of the manual printer 14. In this state, as shown in FIG. 1, the user brings the lower surface of the printer 14 into contact with the recording paper A and moves the printer 14 main body in the direction of arrow X while depressing the print switch 14b.

Upon sweeping of the printer 14 main body, the abutting portions 27a and 27b abut against the paper A, and the rubber roller 29 rotates. Rotation of the roller 29 is transmitted to the gears 31, 32, 33, 34a, 34b, and 35 shown in FIG. 2. Upon rotation of the gear 35, the encoder disk 36 rotates. Since the disk 36 rotates, light emitted from the LED 37 to the photosensor 38 is interrupted through the slits 36a, 36b, . . . Since the printer 14 main body is swept in the X direction, the disk 36 rotates in the forward direction. A pulse signal output from the photosensor 38 is used as an output from the encoder 39 and supplied as a sweep amount detection signal corresponding to a sweep amount of the printer 14 main body to the controller 51 and the printing controller 55. Rotation of the gear 35 is transmitted to the take-up gear 41 and the ribbon take-up shaft 42 via the gear 40 and then to the take-up spool 22b in the ink ribbon cassette 21.

In this manner, the take-up spool 22b rotates to take-up the thermal transfer ink ribbon 23 guided via the head surface of the thermal head 24 and the ink ribbon guide 26. In this case, the shaft 42 rotates in accordance with the sweep amount of the printer 14 main body so that the paper A and the ribbon 23 may not slide against each other. Since the head 24 is normally pushed downward by the elastic member (not shown) inserted between the head mounting member 25 and the head 24, the ribbon 23 is slightly urged against the paper A by the head 24. A stable contact state of the head 24 against the paper A is maintained by contact states of the roller 29 and the abutting portions 27a and 27b. When the printer 14 sweeps for printing in the X direction, the take-up gear 41 is in a forward rotation state, and the stopper arm 43 is kept in contact with the locking portion (not shown).

Figure 5:
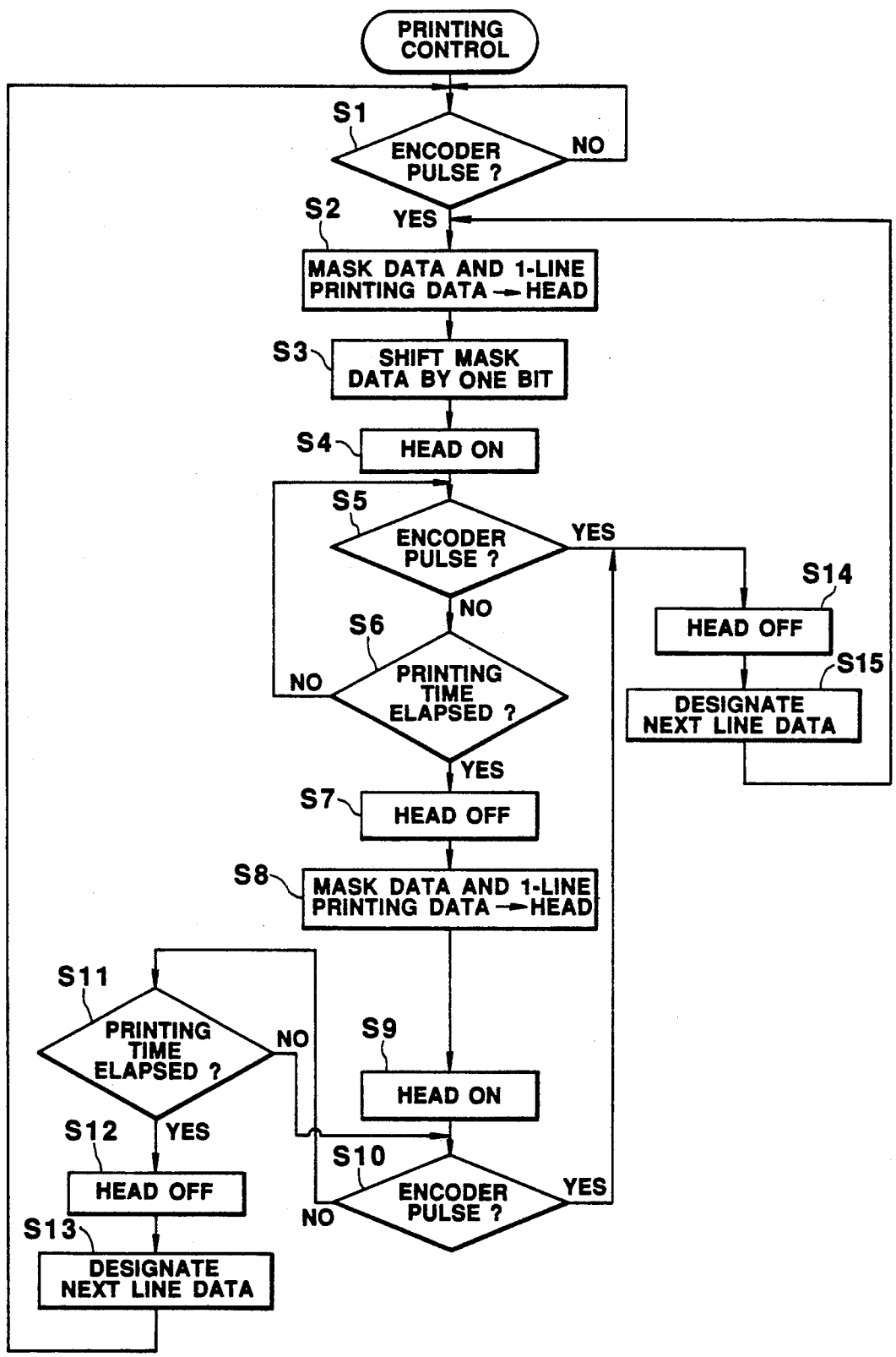
FIG. 5 is a flow chart for explaining a printing control operation performed by the word processor.

The sweep amount detection signal output as the encoder pulse from the photosensor 38 is supplied as the output signal from the encoder 39 to the controller 51 and the printing controller 55. As a result, the controller 51 performs a printing control operation on the basis of a flowchart as shown in FIG. 5. When the encoder pulse is output from the encoder 39, memory addresses in the memory unit 52 are designated in sequence, and the document data stored therein is read out at a predetermined timing (step S1). The readout document data is supplied by the printing character generator 54, read out as printing character pattern data, and supplied to the printing character pattern data buffer 62 of the printing controller 55. The printing character pattern data transferred to the buffer 62 is serial-converted by the P/S converter 63. The serial data is ANDed with the mask data (e.g., 1, 0 1, 0, . . . ) in sequence by the AND gate AND2 and stored in the 48-bit shift register 66. The register 66 stores the one-line (48-bit) printing character pattern data which is masked every other bit. The one-line printing character pattern data masked every other bit by the mask pattern is output to the thermal head 24 (step S2). At this time, the printing control circuit 61 outputs a shift instruction to the mask data register 65, and the mask data is shifted by one bit from "1, 0, 1, 0, . . . " to "0, 1, 0, 1, . . . " (step S3). Thereafter, the circuit 61 outputs a head-ON signal to the head 24, and the selective printing data output to the head 24 in step S2 is thermally transferred onto the paper A via the ribbon 23 (step S4). If a new encoder pulse is not generated during this transfer printing and a predetermined printing time has elapsed, the head driving signal to the head 24 is interrupted, and the first selective printing operation of the one-line printing character pattern data is finished (steps S5 to S7).

When the first selective printing operation of the one-line printing character pattern data is finished, one-line printing character pattern data output via the P/S converter 63 is ANDed in sequence with mask data "0, 1, 0, 1, . . . " shifted by one bit in step S3, stored in the register 66, and then output to the head 24 (step S8). Thereafter, the circuit 61 outputs the head-ON signal to the head 24, and the printing character pattern data output to the head 24 in step S8 is thermally transferred onto the paper A via the ribbon 23 (step S9). If a new encoder pulse is not generated during this thermal transfer and a predetermined printing time has elapsed, the head driving signal to the head 24 is interrupted, and the second selective printing operation of the one-line printing character pattern data is finished (steps S10 to S12). In this manner, the one-line printing character pattern data is divisionally printed every other bit such that the 1st, 3rd, 5th, 7th, ... bits are printed in the first printing operation, and the 2nd, 4th, 6th, 8th, ... bits are printed in the second printing operation.

When divisional printing of the one-line printing character pattern data is finished, the next one-line printing character pattern data in the buffer 62 is designated, and the operation waits until the next encoder pulse is input upon sweeping of the printer 14 (step S13).

That is, while the printer 14 is swept to sweep at a normal speed to perform the first or second selective printing operation, if an encoder pulse representing that the printer 14 has been swept to a printing position of the next one-line data is not output, this divisional printing operation is completely performed, and all the bit data of the one line (48 bits) are printed.

An operation performed when the next encoder pulse is output from the encoder 39 during the printing control operation will be described below.

When the encoder pulse is output during the first selective printing operation, i.e., while the thermal head 24 is in an ON state on the basis of the first selective printing data, the head-ON signal from the printing control circuit 61 to the head 24 is interrupted (step S5→S14). The circuit 61 then designates one-line printing character pattern data to be printed next for the data buffer 62 (step S15). The one-line printing character pattern data is ANDed with mask data (0, 1, 0, 1, ... ) shifted by one bit in step S3 upon first selective printing and transferred to and stored in the 48-bit shift register 66. Thereafter, the one-line printing character pattern data is output to the head 24 to perform first selective printing (step S15→S2 to S4). At this time, the mask data is shifted by one bit in step S3. Therefore, when the encoder pulse is output during the first selective printing, one-line printing character pattern data is read out from the buffer 62 and ANDed with the mask data (1, 0, 1, 0, ... ) shifted by one bit, as described above. That is, if a sweeping state of the printer 14 in which the encoder pulse is generated during the first selective printing operation continues, i.e., a sweep velocity exceeding state continues, one-line printing character pattern data is updated each time the encoder pulse is output, and selective bits are shifted by one bit and printed in sequence. That is, if printing character pattern data of a first line is selected and printed every other bit, i.e., 1st, 3rd, 5th, 7th, ... bits are selected and printed, 2nd, 4th, 6th, 8th, ... bits of printing character pattern data are printed for a second line, and 1st, 3rd, 5th, 7th, ... bits of printing data are printed for a third line. In this manner, printing character pattern data is alternately selected and printed every other bit. Therefore, although only 24 dots of the 48 dots are printed in the first selective printing operation of each printing line, selected bits cover the entire data every other bit. Therefore, character shapes of the printed data are not obscured, and no unnecessary interval is produced.

If, for example, the sweeping velocity of the manual printer 14 is slightly high and the encoder pulse is generated from the encoder during the second selective printing operation, the head-ON signal from the circuit 61 to the head 24 is immediately interrupted (step S10→S14). The circuit 61 designates one-line printing character pattern data to be printed next for the buffer 62 (step S15). The next one-line printing character pattern data is ANDed with mask data (0, 1, 0, 1, ... ) shifted by one bit upon first selective printing (step S3) and transferred to and stored in the register 66. Thereafter, the one-line printing character pattern data is then output to the head 24 to perform first selective printing (steps S15→S2 to S4). When the first printing operation is finished, the printing character pattern data of the same printing line is masked by mask data obtained by shifting the first mask data by one bit, thereby performing second selective printing (steps S3 to S9). When the state in which the sweeping velocity of the printer 14 is slightly high continues, the encoder pulse is output during the second selective printing operation for the second line, and the next one-line printing character pattern data is read out from the buffer 62 accordingly. The readout one-line printing character pattern data is ANDed with the same data (1, 0, 1, 0, ... ) as the second mask data of the second line (steps S10→S14, S15→S2). That is, if the state in which the encoder pulse is output during the second selective printing operation, i.e., the state in which the sweeping velocity of the printer 14 is slightly high continues, each one-line printing character pattern data is updated by the encoder pulse output during the second printing operation. Therefore, on each printing line, although a printing dot density obtained by the second selective printing operation is slightly decreased, the first selectively printed dots cover the entire data every other bit with a sufficient printing density. Therefore, character shapes of printed data are not obscured, and no unnecessary interval is produced.

Figure 6A:
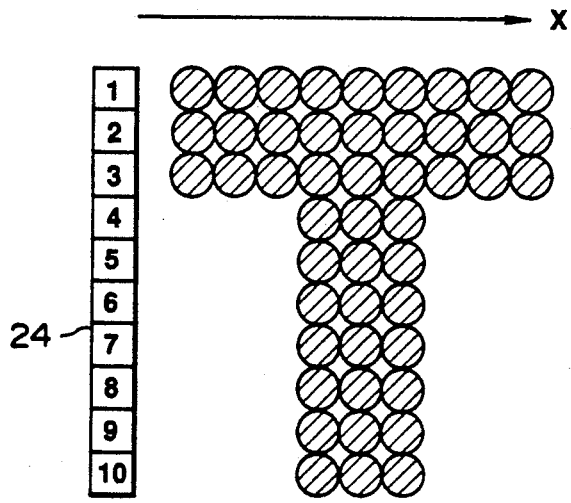
FIGS. 6A and 6B are views showing states of printed characters obtained by the word processor shown in FIG. 2.
Figure 6B:
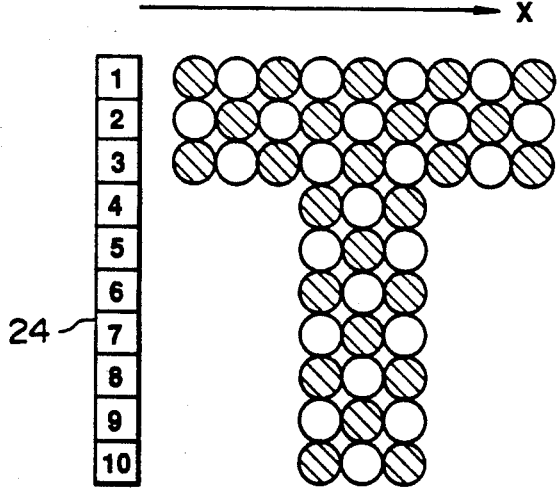

FIGS. 6A and 6B show states of printed characters corresponding to the respective printing dots of the thermal head 24. FIG. 6A shows a case in which the sweeping velocity of the printer 14 is normal, and FIG. 6B shows a case in which the sweeping velocity of the printer 14 is too high. As shown in FIG. 6B, even if the sweeping velocity of the printer 14 is too high and only half the number of printing dots of the head 24 that are used in the first selective printing are always driven on each printing line, the shapes of printed characters are not largely deformed nor obscured because the driven printing dots are selected every other dot.

Therefore, according to the word processor having the above arrangement, document data can be printed on the recording paper A of any type such as a bound notebook. In addition, each one-line printing character pattern data is selected every other bit to divisionally perform printing. Therefore, if, for example, the sweeping velocity of the printer 14 is too high and only the first half selected bits can be printed, the shapes of printed characters are not largely deformed, and a desired printed pattern can be obtained.

Figure 7A:
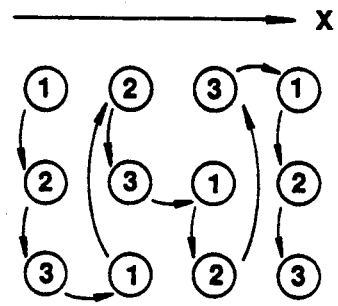
FIGS. 7A to 7C are views for explaining another embodiment of the present invention.
Figure 7B:
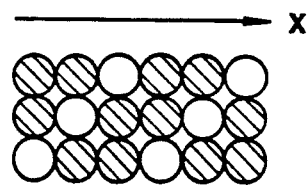
Figure 7C:
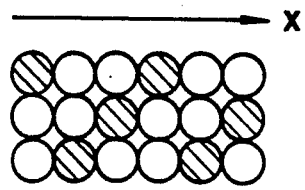

In the above embodiment, a time-division printing method of the thermal head 24 is 2-time-division printing. However, as shown in FIG. 7A, 3-time-division printing can be adopted. In this case, if the sweeping velocity of the manual printer 14 is slightly high and the encoder pulse is output during the second selective printing operation, every second dots are printed on each printing line, as shown in FIG. 7B. If the sweep velocity of the printer 14 is too high and the encoder pulse is output during the first selective printing operation, only the first dots are printed on each printing line, as shown in FIG. 7C. In this case, the one-line printing character pattern data is divided into three such that every third bits are selected i.e., 1st, 4th, 7th, ... bits, 2nd, 5th, 8th, ... bits, and 3rd, 6th, and 9th, ... bits are grouped and printed. Therefore, even if a printing operation of the next line starts before the one-line printing character pattern data is completely printed, printed shapes of characters are not largely deformed.

What is claimed is:

1. A printing apparatus comprising:
   printing means having a plurality of printing elements arranged in a line and divided into a plurality of sets each having N printing elements where N is a positive integer greater than 1, for printing data on a printing medium;
   carriage means for carrying said printing means in a direction perpendicular to said line to transverse a plurality of printing positions;
   printing position detecting means for generating a printing position signal upon detecting that said printing means has been carried to each one of said plurality of printing positions on said printing medium;
   data source means for supplying to said printing means a plurality of printing signals related to said data and corresponding, respectively, to said plurality of printing positions, one of said plurality of printing signals being supplied by the data source means to said printing means when said printing position detecting means detects that said printing means has arrived at a corresponding one of the plurality of printing positions;
   energizing means for at a given time energizing at least one printing element in each of at least one set from said plurality of sets of N printing elements in accordance with said printing signals supplied from said data source means to said printing means;
   control means for controlling said energizing means, so as to start an energizing operation of said energizing means in response to said printing position signal, and so as to energize at least another printing element from said at least one set of N printing elements by means of said energizing means at a time after said given time in accordance with predetermined timing until the occurrence of the earlier of (a) a next printing position signal, and (b) all the plurality of printing elements have been energized at said printing position; and
   wherein said carriage means enables carrying said printing means from one of said plurality of printing positions to a next printing position at a speed such that occurrence of the corresponding next printing position signal occurs earlier than energization of all the plurality of printing elements in accordance with said predetermined timing.

2. A printing apparatus of claim 1, wherein said control means controls said energizing means, for starting the energizing operation of said energizing means for sequentially energizing a different printing element of said at least one set of N printing elements every time said printing position signal is generated.

3. A printing apparatus of claim 1, wherein said control means includes:
   designating means for designating said at least one printing element in the at least one set of N printing elements to be energized by said energizing means at said given time, when said printing position signal is generated; and
   selecting means for selecting another of said at least one set of N printing elements to be energized by said energizing means at said time after said given time.

4. A printing means of claim 3, wherein said designating means designates one of said at least one set of N printing elements, every time said printing position signal is generated.

5. A printing apparatus of claim 1, wherein said energizing means includes:
   masking means having masking data, for masking (N−1) bits of data for at least one set of N bits of data supplied from said data source means to said printing means and for producing corresponding masked data; and
   driving means for driving said printing means based on said masked data produced by masking means.

6. A printing apparatus of claim 5, wherein said control means includes:
   designating means for designating predetermined masking data when said data is supplied from said data source means to said printing means; and
   shifting means for shifting said masking data designated by said designating means, in sequence.

7. A printing means of claim 1, wherein
   said carriage means includes housing means which is manually sweepable across said printing medium and in which said printing means is mounted;
   said printing position detecting means includes position-detecting means for detecting a position of said printing means, relative to said printing medium, as said housing means is manually swept across said printing medium, and for producing said printing position signals representing a printing position every time said housing means is swept over a predetermined distance; and
   said data source means supplies said data to said printing means in response to said printing position signals produced by said position-detecting means.

8. A printing apparatus of claim 1, wherein said printing means includes a thermal head having a plurality of thermal heating elements arranged in the line.

9. A printing apparatus of claim 8, wherein said printing means further includes ink ribbon means interposed between said thermal head and said printing medium, for transferring ink onto said printing medium while said thermal head is operated.

10. A method of operating a printing apparatus which includes a printing means having a plurality of printing elements arranged in a line and divided into a plurality of sets each having N printing elements, where N is a positive integer greater than 1, for printing data on a printing medium, the method comprising the steps of:
    moving said printing means in a direction perpendicular to the line to traverse a plurality of printing positions;
    detecting that said printing means has been moved to each one of said plurality of printing positions on said printing medium and, in response thereto, generating a printing position signal;
    supplying to said printing means a plurality of printing signals related to said data and corresponding, respectively, to said plurality of printing positions, one of said plurality of printing signals being supplied to said printing means when it is detected that said printing means has arrived at a corresponding one of the plurality of printing positions;
    energizing at a given time at least one printing element in each of at least one set from said plurality of sets of N printing elements, in accordance with said printing signals supplied to said printing means supplied to said printing means and in response to said printing position signal; and energizing at least another printing element from said at least one set of N printing elements at a time after said given time in accordance with predetermined timing until the occurrence of the earlier of (a) a next printing position signal, and (b) all the plurality of printing elements have been energized at said printing position; and enabling said printing means to be carried from one of said plurality of printing positions to a next printing position at a speed such that occurrence of the corresponding next printing position signal occurs earlier than energization of all the plurality of printing elements in accordance with said predetermined timing.

11. A method of claim 10, wherein said energizing step includes the step of designating a different printing element of said at least one set of N printing elements every time said printing position signal is generated.

12. A method of claim 10, wherein said energizing step includes masking (N−1) bits of data for at least one set of N bits of data supplied to said printing means, and producing corresponding masked data; and driving said printing means based on said masked data.

13. Apparatus for printing while being swept manually across a printing medium, comprising:

printing means having a plurality of printing elements arranged in a line for printing images on a printing medium;

carriage means containing said printing means for carrying said printing means in a direction perpendicular to said line;

means in said carriage means responsive to movement of said carriage means in said direction for detecting arrival of the printing means at each of a plurality of printing positions on said printing medium and producing a printing position signal corresponding thereto;

data source means having stored therein printing data to energize said printing elements for said plurality of printing positions on said printing medium;

means for retrieving said printing data from the data source means to be available for energizing said printing elements for each respective printing position;

timing means for generating a triggering signal at time intervals commensurate with a maximum normal speed for sweeping the printing apparatus across said printing medium;

means for passing printing data for one printing position from the retrieving means to the printing elements so that (a) only a designated portion of all the printing elements is energized at a given instant of time in response to said printing position signal, and (b) in response to the triggering signal of said timing means, other portions of all the printing elements are energized after said given instant of time; and means to inhibit energization of said other portions of the total number of printing elements when the printing means is swept across the printing medium at a speed high enough such that a printing position signal occurs while energization of printing elements at said one printing position is proceeding in response to the triggering signal of the timing means.

14. Apparatus for printing while being swept manually across a printing medium, comprising:

printing means having a plurality of printing elements arranged in a line for printing images on a printing medium;

means for generating a printing position signal in response to movement of said printing means a predetermined distance over the printing medium in a direction perpendicular to said line;

means responsive to one printing position signal for energizing a predetermined portion of all the printing elements in accordance with printing data obtained for a particular printing position;

means for energizing at said particular printing position at least one other predetermined portion of all the plurality of printing elements during a selected time interval after energization of said predetermined portion is initiated; and means for inhibiting energization of printing elements at said particular printing position when another printing position signal is generated before termination of said selected time interval.

15. The apparatus of claim 14, further comprising means to energize said at least one other portion of all the plurality of printing elements at a printing position next succeeding said particular printing position when energization of said other portion was inhibited at said particular printing position.

* * * * *